United States Patent
Kartadinata et al.

(10) Patent No.: US 12,535,085 B1
(45) Date of Patent: Jan. 27, 2026

(54) FAN MOUNTING SYSTEM

(71) Applicant: HEWLETT PACKARD ENTERPRISE DEVELOPMENT LP, Spring, TX (US)

(72) Inventors: Warren Antonio Kartadinata, Castro Valley, CA (US); Vance Brey Murakami, Los Gatos, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/894,532

(22) Filed: Sep. 24, 2024

(51) Int. Cl.
| | |
|---|---|
| F04D 29/64 | (2006.01) |
| F04D 19/00 | (2006.01) |
| F04D 29/52 | (2006.01) |
| F04D 29/70 | (2006.01) |
| H05K 7/20 | (2006.01) |

(52) U.S. Cl.
CPC ......... F04D 29/646 (2013.01); F04D 19/002 (2013.01); F04D 29/522 (2013.01); F04D 29/703 (2013.01); H05K 7/20172 (2013.01); H05K 7/20736 (2013.01)

(58) Field of Classification Search
None
See application file for complete search history.

(56) References Cited

U.S. PATENT DOCUMENTS

| | | | | |
|---|---|---|---|---|
| 7,145,771 | B2 * | 12/2006 | Wang | H05K 7/20172 |
| | | | | 415/213.1 |
| 7,352,574 | B2 * | 4/2008 | Chen | G06F 1/20 |
| | | | | 165/104.34 |
| 7,940,525 | B2 * | 5/2011 | Letourneau | H05K 7/20172 |
| | | | | 361/679.48 |
| 8,608,438 | B2 * | 12/2013 | Shu | G06F 1/183 |
| | | | | 415/214.1 |
| 2004/0257767 | A1 * | 12/2004 | Wang | H05K 7/20172 |
| | | | | 361/695 |
| 2006/0279929 | A1 * | 12/2006 | Chen | G06F 1/20 |
| | | | | 361/697 |
| 2010/0107397 | A1 * | 5/2010 | Letourneau | H05K 7/20172 |
| | | | | 29/466 |
| 2012/0156030 | A1 * | 6/2012 | Shu | G06F 1/20 |
| | | | | 415/213.1 |
| 2020/0396862 | A1 | 12/2020 | Tsorng et al. | |
| 2022/0065268 | A1 | 3/2022 | Lu et al. | |

\* cited by examiner

*Primary Examiner* — Juan G Flores
(74) *Attorney, Agent, or Firm* — Jones Robb, PLLC

(57) ABSTRACT

An information processing system includes a support tray and a chassis supporting the support tray. The support tray may be part of an input/output module (IOM) removably received in the chassis. A fan frame is attached to the support tray. A fan assembly may be coupled to the fan frame. The fan assembly comprises a fan housing containing a fan rotor, a first fan guard having a first set of integrally formed teeth coupled to the fan housing and a second fan guard having a second set of integrally formed teeth coupled to the fan housing opposite the first fan guard. The first and second sets of teeth engage the fan frame to selectively attach the fan assembly to the fan frame. The fan frame may hold the fan assembly within an opening in the support tray in a recessed position relative to a face of the support tray.

13 Claims, 11 Drawing Sheets

FAN MOUNTING SYSTEM

Computer systems (e.g., servers) generate heat during operation and, if the heat is not dissipated or cooling is not provided, damage can occur to various components within the system. One way of cooling is installing fans, where the fans are electrically connected at fan connection points on the motherboard. Once installed, the fans are able to provide the necessary cooling for the system.

BRIEF DESCRIPTION OF THE DRAWINGS

The present disclosure can be understood from the following detailed description, either alone or together with the accompanying drawings. The drawings and related description of the figures are included to provide a further understanding of the present disclosure and are incorporated in and constitute a part of this specification. The drawings illustrate one or more nonlimiting aspects and implementations of the present teachings and together with the description explain certain principles and operation. In the drawings.

DETAILED DESCRIPTION

Figure 1A:
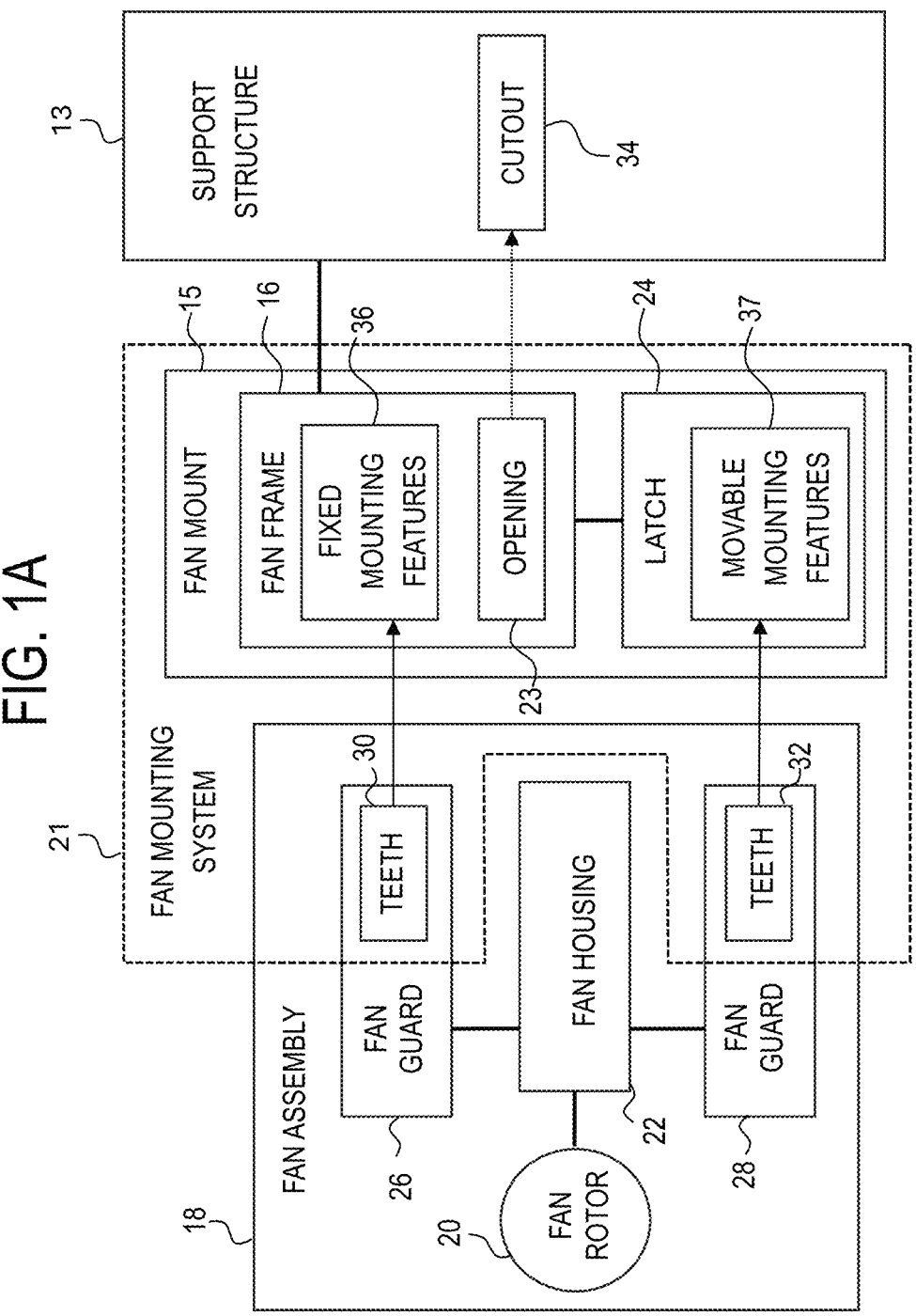
FIG. 1A is a block diagram of an example information processing system using a fan mounting system consistent with the present disclosure.

Generally, fans are installed in an information processing system by attachment to a fan wall (or similar supporting structure) that is coupled to a chassis of the system, which holds the system board (e.g., motherboard) and related components. The fans can be mounted to the fan wall (or other supporting structure) at predetermined fan mounting locations distributed along a length dimension of the fan wall (which corresponds to a width dimension of the chassis). For example, the fan wall may include attachment features (e.g., screw holes) for attaching the fans to the fan wall.

Generally, fans for information processing devices come in certain predetermined sizes which are designed for certain predetermined classes of information processing devices. For example, information processing devices commonly come in industry standard sizes classified as 1 U, 2 U, 3 U, 4 U, etc., where U refers to a measurement known as a "rack unit" and refers to the height of the server. Thus, fans are generally produced in corresponding sizes (e.g., 40 mm fans are commonly produced for use in 1 U devices, 60 mm or 80 mm fans for 2 U devices, etc.). However, in some cases, one of these industry standard fans might not fit within the available space in a system. For example, a certain 2 U server may include two nominally 1 U input-output-modules (IOM) which are housed inside the chassis of the server in a stacked arrangement. Each of these 1 U IOM may have its own set of fans. However, the 1 U IOM may actually be slightly shorter than 1 U in height because two such IOMs need to fit within the interior of a 2 U chassis and some of the 2 U height of the server is taken up by things like the thicknesses of the chassis walls and tolerances to allow for insertion and removal of two 1 U IOM. Accordingly, because the IOM are not actually 1 U in height, industry standard 1 U fans (fans designed for 1 U devices) might actually be slightly too tall to fit within the space allocated to the IOM.

Thus, to address these and other issues, the present disclosure provides a fan mounting system which allows for fans to be mounted with a lower profile than would otherwise be possible, which can allow the fans to fit within a device that they otherwise would not fit—for example, allowing a 1 U fan to fit in a device which is actually less than 1 U in height, such as the aforementioned IOM. The fan mounting system comprises a fan mount and a fan assembly designed to be received in the fan mount. The fan mount comprises a fan frame to be attached to a support structure of the system (e.g., an IOM tray) and a latch to engage the fan and secure it to the fan frame. The fan frame is designed to fit over a cutout in the support structure and to hold the fan in a slightly recessed position in the cutout. In the recessed position, the fan assembly is at least partially within the cutout with a bottom thereof being below a top surface of the support structure. This recessed positioning of the fan can allow the distance that the fan protrudes above the support structure to be smaller than the overall height of the fan.

The fan assembly includes a pair of fan covers disposed on each end of the fan assembly, opposite one another. The fan mounting system comprises a set of teeth extending outwardly from a lower portion of each fan cover. Each tooth comprises a protrusion designed to engage with the latch of the fan mount to secure the fan assembly to the fan frame.

The fan frame is coupled to a face of the support structure and disposed in part in the cutout. The fan frame comprises a set of fixed mounting features on one side of the cutout to engage with the teeth of one fan cover. The latch is attached to the frame on the other side of the cutout and comprises a set of movable mounting features arranged to engage the teeth of the other fan cover. Each of the mounting features includes an undercut into which one of the teeth can be received, in which state a top portion of the mounting feature is positioned above the tooth and thus prevents the tooth from moving away from the support structure. In this manner, the mounting features engage with the teeth to secure the fan assembly to the support structure. The latch can move parallel to the support structure between a latched position and an unlatched position, thus allowing for selective engagement and disengagement of the movable mounting features from the teeth.

In some examples, the teeth on one side of the fan assembly are first engaged with the fixed mounting features, with the fan assembly being tilted at an angle to the support structure to allow the teeth to be received in their undercuts. Then, the fan is rotated downwards until the teeth on the other side of the fan assembly contact the movable mounting features. At this point, a user may move the latch to the unlatched position, either by moving a handle of the latch or by applying a downward force to the fan assembly which causes the sloped/ramped surfaces of the teeth to slide against the movable mounting features and thereby force the latch to move to the unlatched position. With the latch in the unlatched position, the teeth can move downward past the top portion of the movable mounting features, whereupon the latch can be moved back into the latched position with the teeth being received in the undercuts of the movable mounting features. The fan can be released from the fan frame by a user moving the latch to the unlatched position.

In some examples, the latch is toolless; that is, the latch does not require any additional tools or implements beyond the user's hands to engage or disengage the latch with the fan assembly. In addition, in some examples, the mounting system may allow a user to install or remove a fan assembly from the fan mount using only one hand.

Some implementations of the latch makes use of detent features. In these examples, the latch comprises a front portion with two legs, with each leg including one of the movable mounting features with an undercut to engage with a corresponding front tooth. A body extends outwardly from the legs. Two deformable arms extend outward from the body, opposite from the legs. Each arm includes a detent feature to interact with the fan frame. More particularly, when the latch is in the lock position, the undercuts are engaged with the front teeth and the detent features of the arms push outwardly against the fan frame. In this way, the latch is maintained in the "lock" position. When a user desires to unlock the latch, they apply forces to the latch which cause the arms to deflect inward and deform as the latch is pulled out, releasing the teeth from the undercuts. Once the latch reaches its "unlock" position, the detent features push against a portion of the fan frame to maintain the latch in its unlocked position. As a result, the fan assembly can be removed from the system. An advantage of the detent features latch is that it is able to be operated with a single hand by the user, allowing the user to lock and unlock the fan assembly with only one hand.

In other implementations the latch uses spring features. As with the detent latch, the spring latch includes a front portion with two legs having the movable mounting features engage with a corresponding front tooth at an undercut and a body. Two arms extend down from the body, with each arm having a spring feature. Each spring feature biases the arm to an extended position such that the arms sit against the fan frame when the latch is in the locked position. To unlock the latch, the arms are pushed in towards the body to allow a user to pull the latch out, disengaging the undercuts from the front teeth. However, unlike the detent latch, if the arms are released when in the unlocked position, the spring latch will return to the lock position due to the biasing of the spring features. As such, in order to unlock and remove the fan assembly, a user must use two hands: one to maintain the latch in the unlocked position and one to remove the fan assembly.

Figure 1B:
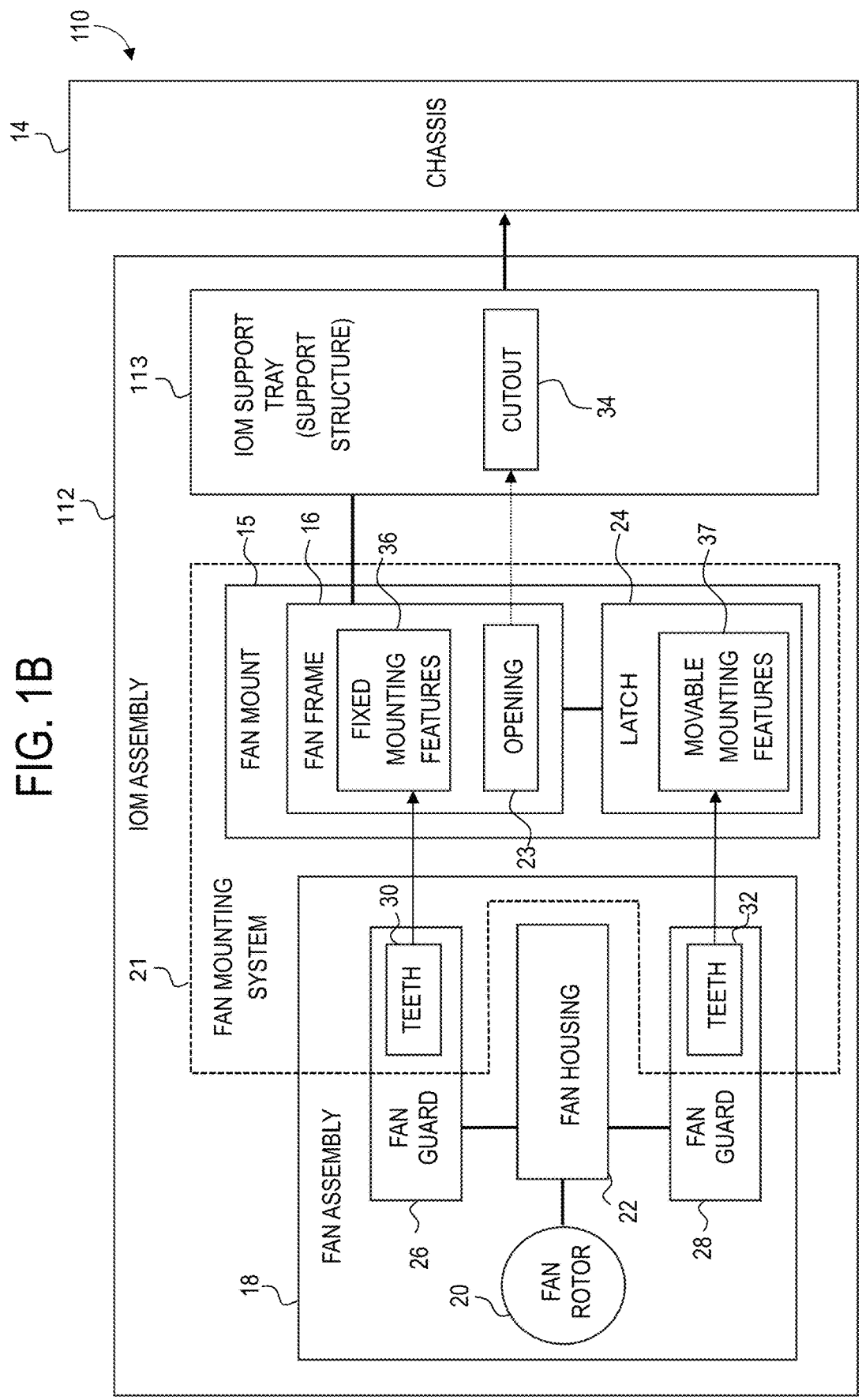
FIG. 1B is a block diagram of another example information processing system using a fan mounting system consistent with the present disclosure.

FIG. 1A is a block diagram of an example fan mounting system 21 and an example information processing system 10 using the fan mounting system 21 consistent with the present disclosure. FIG. 1B is a block diagram of another example information processing system 110 using the fan mounting system 21 consistent with the present disclosure. The information processing system 110 is one example implementation for the information processing system 10. The fan mounting system 21 is illustrated in an installed stated in the systems 10 and 110 to facilitate understanding, but some examples disclosed herein comprise the fan mounting system 21 in an uninstalled state (i.e., a state in which the fan mounting system 21 is separate from some or all of the other components of the system 10 and 110).

FIGS. 1A and 1B illustrate the components of the fan mounting system 21, the system 10, and the system 110 schematically, showing the structural and functional relationships therebetween in schematic/conceptual form. Thus, FIGS. 1A and 1B do not illustrate the shapes, dimensions, spatial relationships, or other physical properties of the components unless otherwise noted. The positioning of one block inside or outside of another block does not necessarily indicate any positional relationship between the components represented by the blocks (unless otherwise noted). Instead, if a first block is illustrated within a second block, this indicates that the component represented by the first block is conceptually a part of (e.g., a subcomponent of) the component represented by the second block. Physical couplings or engagements between components are indicated in FIGS. 1A and 1B by solid lines extending between the blocks representing those components, with solid-lined arrows indicating a coupling or engagement that is designed to be intermittent and/or relatively easy to decouple or disengage (as opposed to a more permanent coupling or engagement which is not ordinary decoupled/disengaged during normal usage and may require tools or destructive techniques to reverse).

As shown in FIG. 1A, system 10 includes a support structure 13, one or more fan assemblies 18 (only one is illustrated), and a fan mounting system 21. The system 10 may comprise a server, a networking device, an edge computing device, or any other information processing device. The system 10 may include information processing components (not illustrated), such as a processor, memory, etc., as well as a chassis (not illustrated) and other support structures. Among these support structures is the support structure 13, which may support the fan assembly 18 and, in some examples, some (or all) of the information processing components.

As shown in FIG. 1B, the system 110 comprises the fan assembly 18 and the fan mounting system 21. Furthermore, in the implementation of FIG. 1B, the system 110 includes an input-output-module (IOM) assembly 112 coupled to and/or supported by a chassis 14, with the fan assembly 18 and the fan mounting system 21 being part of the IOM assembly 112. In this example, the support structure 13 is implemented as an IOM support tray 113 of the IOM assembly 112. As used herein, an IOM refers to a module which manages the communication between a processor and a network. The communication may include, but is not limited to, data transfer, power load management, and control of machine functions. For example, servers which are specialized for data storage often have one or more of these IOM to manage the large amount of data communicated to and from the server, and in such systems the IOM may include or function as a host-bus-adapter (HBA) of the storage system. The IOM assembly may include a support tray 113 to which the other components of the IOM assembly 112 may be coupled. For example, the IOM assembly 112 may comprise a housing which supports and fully or partially encloses the information processing components thereof, and the support tray 113 may be a bottom wall/panel of that housing. In some examples, the IOM assembly 112 is configured as a removable module which can be removably inserted into a corresponding receptacle in the chassis 14. Although only one IOM assembly 112 is illustrated, in some examples there are multiple IOM assemblies 112 per system 110, in which case the system 110 may also comprise multiple fan mounting systems 21 (e.g., one fan mounting system 21 per IOM assembly 112).

As shown in FIGS. 1A and 1B, the one or more fan assemblies 18 may be attached to the support structure 13/113 via the fan mounting system 21. The fan mounting system 21 comprises one or more fan mounts 15, as well as teeth 30 and 32 which are part of the fan assembly 18. Each fan mount 15 comprises a fan frame 16 and a latch 24 movably coupled to the fan frame 16. Each fan assembly 18 is mounted to the support structure 13 via a corresponding fan mount 15. Thus, in examples in which the system 110 has multiple fan assemblies 18, the system 110 may have at least a corresponding number of fan mounts 15 to mount those fan assemblies 18. The fan frame 16 may be attached to the support structure 13/113 and the fan assembly 18 may be attached to the fan frame 16 by engagement of teeth 30/32 with the fan frame 16 and the latch 24, and in this manner the fan mount 15 secures the fan assembly 18 to the support structure 13/113.

The fan frame 16 is attached to the support structure 13/113 adjacent a cutout 34 in the support structure. The cutout 34 may be a recess in the support structure 13 sized to be able to receive at least a bottom portion of the fan assembly 18. In some examples, the recess of the cutout 34 may extend all the way through the thickness of the support structure 13 so that the cutout 34 is an aperture through the support structure 13. In other examples, the recess of the cutout 34 may extend only partway through the thickness of the support structure 13.

The fan frame 16 comprises an opening 23 configured to be, in an installed state of the fan mount 15 on the support structure 13, aligned with the cutout 34 (as indicated by the dotted-line arrow in FIGS. 1A and 1B) such that a bottom portion of the fan assembly 18 can be inserted through the opening 23 into the cutout 34. Specifically, if the fan mount 15 is mounted on a first side of the support structure 13/113, then the fan assembly 18 is to be inserted from the first side of the support structure into the opening 23 and into the cutout 34 in a direction toward the second side of the support structure 13/113 opposite the first side. A portion of the fan frame 16 may encircle the cutout 34 and abut a rim thereof. Another portion of the fan frame 16 may, in some examples, extend at least partially down into the cutout 34. In some examples, the fan frame 16 may be coupled to the support structure 13/113 by adhesive, welding, mechanical fasteners (e.g., screws, rivets, etc.), or other suitable fastening mechanism. An implementation example of the fan frame 16 is illustrated in FIGS. 2-5 in the form of fan frame 216, which will be discussed further below.

As noted above, the fan mounting system 21 comprises teeth 30 and 32 which are also part of the fan assembly 18, and the fan assembly 18 may be coupled to and/or received by the fan mount 15 by engagement of the teeth 30 and 32 with mounting features 36/37 of the fan mount 15. These teeth 30/32 and mounting features 36/37 will be described in turn below.

The fan assembly 18 may include a fan rotor 20 contained within a fan housing 22 and teeth 30/32 coupled, directly or indirectly, to the housing 22. In some examples, the teeth 30/32 are provided as part of fan guards 26/28, which are coupled to the fan housing 22. In some examples, the teeth 30/32 are part of, or directly connected to, some other portion of the fan housing 22. In some examples, the fan guards 26/28 are integrally part of the fan housing 22 rather than separate parts, and the teeth 30/32 are part of, or directly connected to, the fan housing 22.

For instance, in some examples, a first fan guard 26 may be coupled to a first side of the fan housing 22. The first fan guard 26 may include a first fan guard body coupled to the fan housing 22 and a first set of teeth 30 coupled to the first fan guard body. As used herein, a tooth refers to a projection on a body that is designed to engage with a complementary feature on a second body. In some examples, the first set of teeth 30 may be integrally formed with the fan guard body of the first fan guard 26. Said differently, the first set of teeth 30 and the fan guard body together form a unitary body which is the first fan guard 26. In other examples, the first set of teeth 30 may be formed separately from the fan guard body of the first fan guard 26 and may be coupled thereto by mechanical fasteners, chemicals (e.g., adhesives), or other fastening mechanisms.

Similarly, in some examples, a second fan guard 28 may be coupled to a second side of the fan housing 22. The second fan guard 28 may include a second fan guard body coupled to the fan housing 22 and a second set of teeth 32 coupled to the second fan guard body. The second side of the fan housing 22 may be disposed opposite the first side of the fan housing 22 such that the first fan guard 26 and the second fan guard 28 are disposed opposite each other and separated by the length of the fan housing 22. In some examples, the second set of teeth 32 may be integrally formed with the second fan guard body of the second fan guard 28 such that second set of teeth 32 protrude from the second fan guard body. In other examples, the second set of teeth 32 may be formed separately from the fan guard body of the second fan guard 28.

As used herein, a "set" comprises one or more elements. Thus, while the plural tense "teeth" is often used herein to refer to the sets of teeth 30/32 for grammatical reasons, the set of teeth 30 may include, in some instances, just one tooth 30 and/or the set of teeth 32 may include, in some instances, just one tooth 32. In some examples, the set of teeth 30 includes exactly two teeth 30 and the set of teeth 32 includes exactly two teeth 32. In other examples, one or both of the sets of teeth 30/32 may include more than two teeth 30/32.

The fan mount 15 comprises sets of mounting features 36 and 37 which are configured to engage with the sets of teeth 30 and 32, respectively, to secure the fan assembly 18 to the fan frame 16. The mounting features 37 are part of the latch 24, which is movable relative to the fan frame 16, and thus the mounting features 37 are movable relative to the fan frame 16. Accordingly, the mounting features 37 are also referred to herein as movable mounting features 37. Latching mechanism 24 may thus engage the fan assembly 18 at the second set of teeth 32. More particularly, the movable mounting features 37 of the latching mechanism 24 may selectively engage with the second set of teeth 32 such that fan assembly 18 is selectively latched within the fan frame 16.

The mounting features 36 are part of the fan frame 16 and do not move relative thereto, and thus these are also referred to herein as fixed mounting features 36. The fixed mounting features 36 of the fan frame 16 may include a plurality of openings to receive the first set of teeth 30. More particularly, the mounting features 36 of the fan frame 16 may include recesses (e.g., undercuts) sized to selectively receive and engage the first set of teeth 30. This engagement is further discussed herein.

Each of the mounting features 36/37 may comprise a recess or socket into which a corresponding tooth 30/32 can be inserted. These recesses/sockets may have the form of an undercut, meaning that they (a) have openings which face generally horizontally and (b) have a top wall portion positioned vertically above the recess so that, when the mounting features 36/37 are engaged with the teeth 30/32, the teeth 30/32 protrude through the openings into the recesses/sockets of the mounting features 36/37 along insertion axes that are generally horizontal and the top wall portion of the mounting features 36/37 abuts and blocks the teeth 30/32 from moving upward out of the recess. As used herein, "horizontal" refers herein to a direction parallel to the face of the support 13/113 to which the fan mount 15 is mounted, and "vertical" refers to a direction perpendicular to the face. Generally or substantially horizontal means within +/−30° of horizontal. For example, if the fan mount 15 is mounted to a top side of the support 13/113, then the top wall portions of the mounting features 36/37 may be positioned vertically above the teeth 30/32 such that the mounting features 36/37 prevent movement of the teeth 30/32 in the upward direction.

In some examples in which multiple fan assemblies 18 are present, there may be multiple cutouts 34 in the support structure 13/113 with each corresponding to one of the fan assemblies 18. In other examples in which multiple fan assemblies 18 are present, multiple fan assemblies 18 may share the same cutout 34 (in some cases, with all of the fan assemblies 18 of an IOM assembly 122 sharing the same cutout 34). In some examples in which multiple fan assemblies 18 are present, each fan frame 16 is physically separate from the other fan frames 16. In other examples in which multiple fan assemblies 18 are present, some fan frames 16 may be physically coupled together, for example as parts of the same unitary body. In other words, although each fan assembly 18 has its own corresponding fan mount 15, those fan mounts 15 do not necessarily have to be physically separate bodies but could instead be two different portions of a larger body.

In some examples, the IOM assembly 112 may have dimensions—in particular, height dimensions—that nominally match an industry standard size, such as 1 U, 2 U, etc. However, because the IOM assembly 112 needs to fit within the chassis 14 of the system 110, and because the chassis 14 may itself have dimensions of an industry standard size (e.g., 1 U, 2 U, etc.), the IOM assembly 112 may actually be slightly smaller than its nominal size. For instance, in some examples the system 110 is a 1 U server that includes one IOM assembly 112 which is nominally 1 U in height, but in such systems the IOM assembly 112 is actually slightly smaller in height than 1 U. As another example, in some examples the system 110 is a 2 U server that includes two IOM assemblies 112 which are nominally 1 U in height and which are stacked vertically atop one another in the chassis 14, but, again, the IOM assemblies 112 are actually slightly smaller in height than 1 U. The reasons for the IOM assemblies 112 being smaller than their nominal size include that the walls of the chassis 14 have non-zero thickness, which means that the space within the chassis 14 within which the IOM assemblies 112 are inserted is slightly smaller than 2 U, and also that there needs to be some clearance allotted between the IOM assemblies 112 and the chassis 14 to allow for insertion/removal. Because the IOM assemblies 112 are smaller than their nominal industry standard size, in some instances fans designed to fit within industry standard information processing devices might not actually fit within the housing of the IOM assembly 112. For instance, in some examples, the IOM assemblies 112 may have less than 40 mm of internal vertical space, and therefore the industry standard 40 mm fans that are commonly used in 1 U devices will not fit within the IOM assembly 112. However, because the fan mounting system 21 allows the fan assembly 18 to be disposed at least in part within the cutout 34, a fan assembly 18 having a height of h can fit within an enclosure which has internal vertical clearance that is less than h. For example, if the bottom of the fan assembly 18 is positioned within the cutout 34 a distance d below the surface of the support 13/113 then the top surface of the fan assembly 18 will be positioned a distance of h-d above the surface of the support 13/113, and therefore the fan assembly 18 can fit within an enclosure having internal vertical clearance space of at least h-d. For instance, suppose that a nominally 1 U IOM assembly 112 has internal vertical clearance of 39 mm, then a 40 mm fan assembly 18 could be made to fit within this IOM assembly 112 by recessing the bottom surface of the fan assembly 18 at least 1 mm within the cutout 34.

Figure 2:
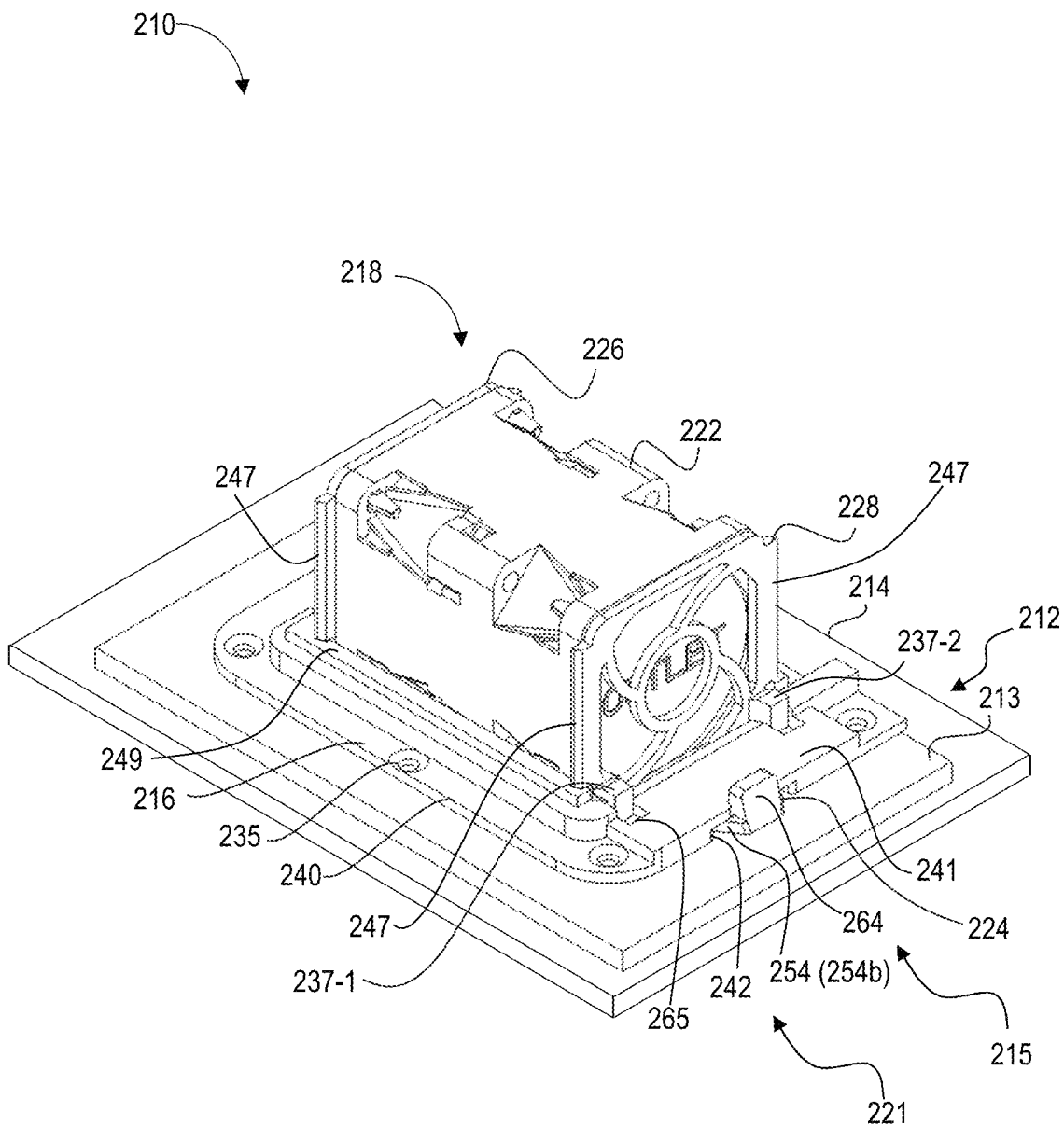
FIG. 2 is a perspective view of a portion of an example information processing system with a fan mounting system consistent with the present disclosure shown in an attached state of a fan module to a fan mount.
Figure 3:
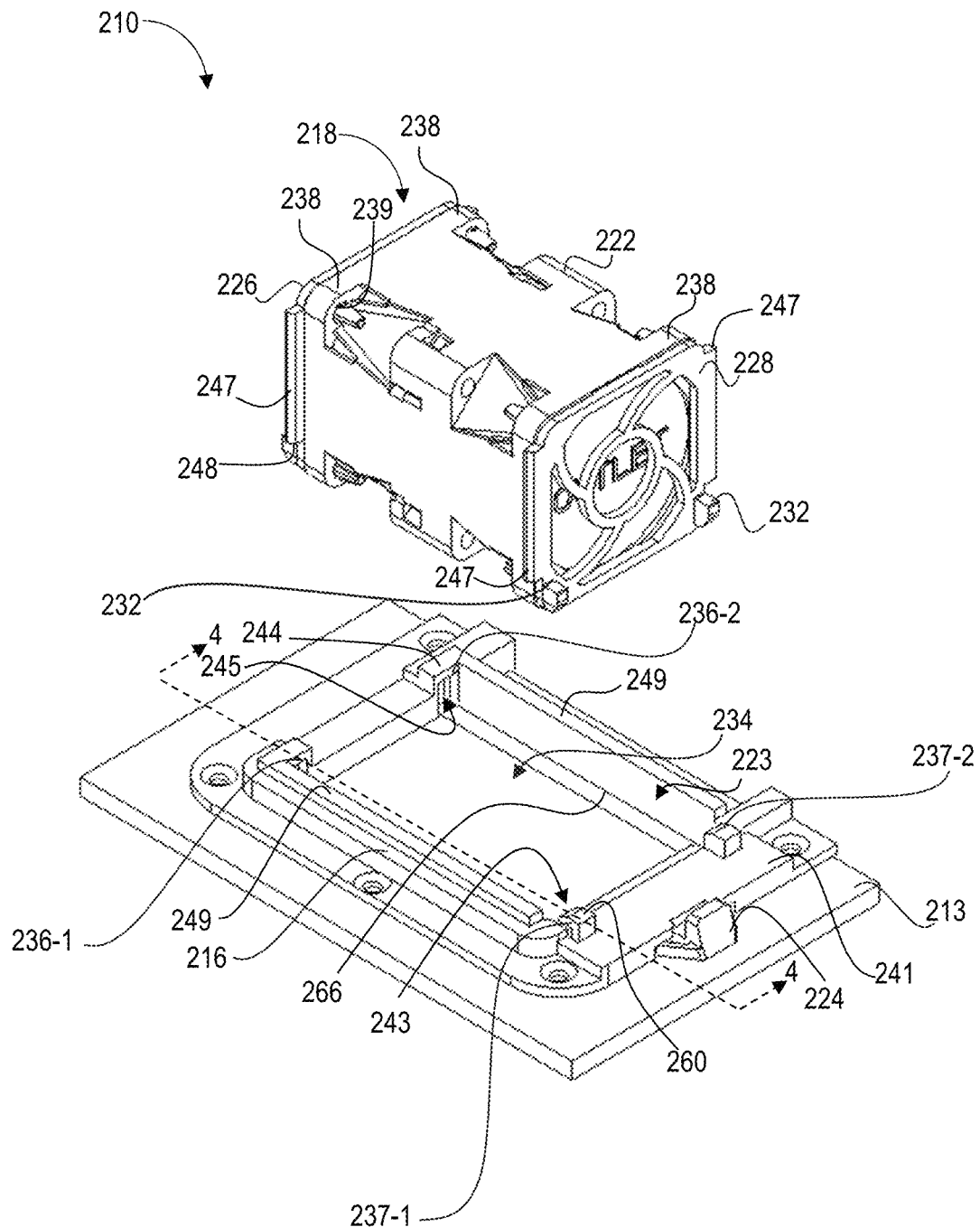
FIG. 3 is a perspective view of the information processing system of FIG. 2 with the fan module in a disengaged state.
Figure 4:
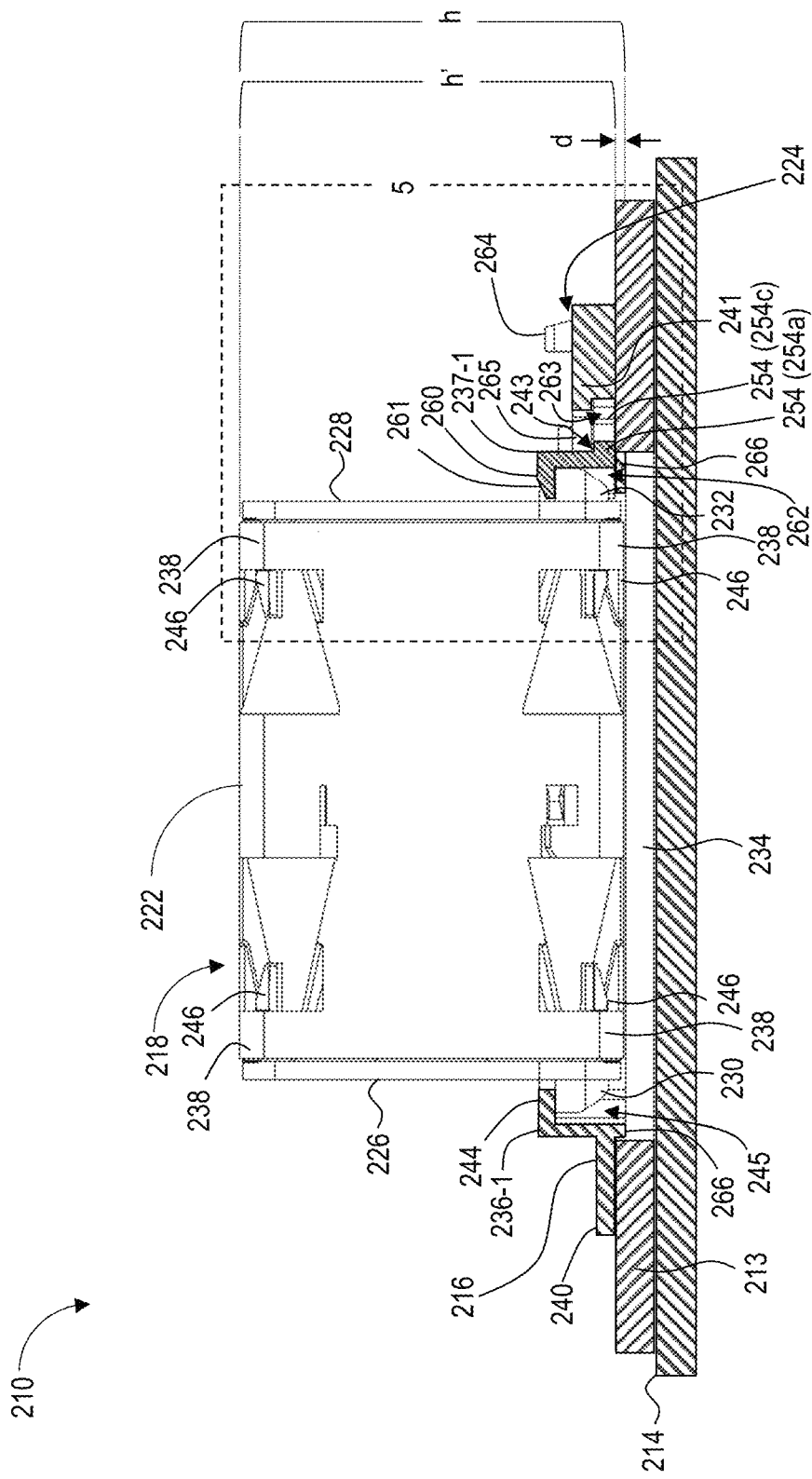
FIG. 4 is a side view with partial cross-section of the fan mounting system of FIG. 2 shown with the fan assembly in the attached state and a latch of the fan mounting system in a latched state.
Figure 5:
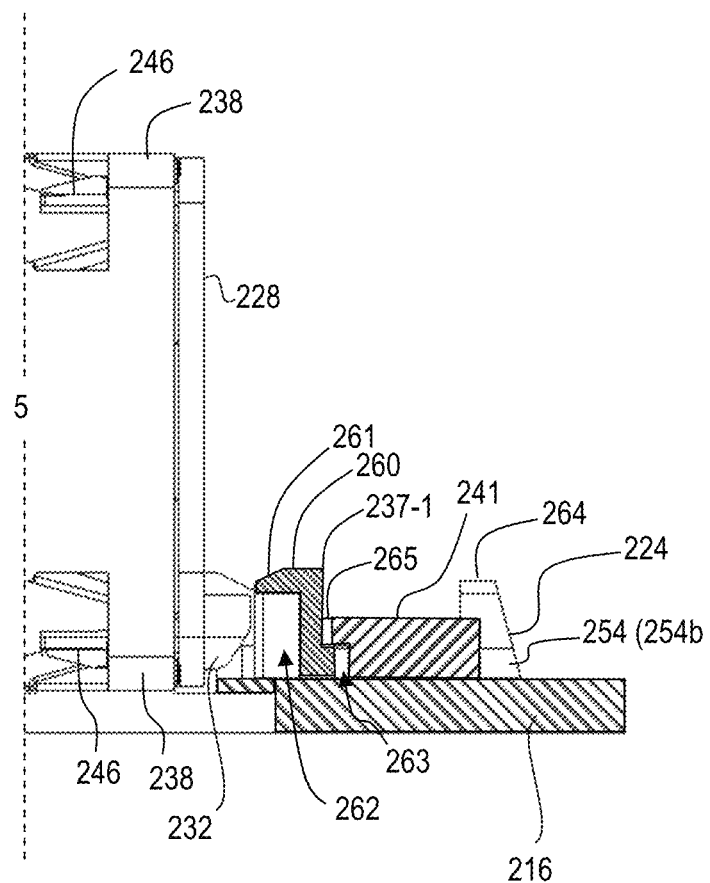
FIG. 5 is side view with partial cross section showing a portion of the fan mounting system of FIG. 2 corresponding to the box 5 of FIG. 4 with the latch in an unlatched state.

FIGS. 2-5 show an example fan mounting system 221 consistent with the present disclosure, together with an information processing system 210 comprising the fan mounting system 221. Information processing system 210 may be one implementation of information processing systems 10 and 110 shown in and described with respect to FIGS. 1A and 1B, and fan mounting system 221 may be one implementation of fan mounting system 21 shown in FIGS. 1A and 1B. In FIGS. 4 and 5, the fan frame 216 is shown in cross-section but the fan assembly 218 is not in cross-section.

Information processing system 210 may include an IOM assembly 212 supported by a chassis 214. Only a portion of the system 210, including part of the chassis 214 and part of a support tray 213 of the IOM assembly 212, is illustrated in FIG. 2, but one of ordinary skill in the art would understand that the system 210 may include additional components, such as a system board, processor, power supply unit, etc. IOM assembly 212 may comprise an IOM support tray 213, as well as additional components as discussed above in relation to IOM assembly 112. Only a portion of a base of the chassis 213 and a portion of the support tray 213 are shown, but it should be understood that these structures may extend beyond what is shown, and the chassis 213 and an enclosure of the IOM assembly 212 may also include other support structures such as side walls, a cover, a front panel, a rear panel, etc.

The fan mounting system 221 comprises a fan mount 215 and teeth 230/232. The fan mount 215 comprises a fan frame 216 and a latch 224. The fan frame 216 may be coupled to the support tray 213 of the IOM assembly 212. As shown in FIGS. 2 and 3, fan frame 216 may be generally rectangular in shape, although examples are not so limited. However, as shown in FIG. 3 in particular, the fan frame 216 may include a plurality of sides surrounding and defining a central opening 223 therein. The fan module 218 may be received within the central opening 223 of fan frame 216.

In addition, as shown in FIG. 3, IOM support tray 213 may include a cutout 234. This cutout may be complete, i.e., extend through the full thickness of the IOM assembly 212, or may be partial, i.e., extend only partially through the thickness of the IOM assembly 212. As shown in FIG. 3, the fan frame 216 may be received in and/or aligned with the cutout 234. Said differently, when fan frame 216 is mounted to the IOM assembly 212, the central opening of the fan frame 216 aligns with the cutout 234. As a result, when fan assembly 218 is installed in fan frame 216, fan assembly 218 can be inserted through the opening 223 and be disposed at least partially within the cutout 234 of IOM assembly 212. Thus, fan assembly 218 is recessed with respect to IOM support tray 213, as shown in FIG. 4. By recessing the fan assembly 218, the effective height h' of the fan assembly 218, meaning the distance between the top of the IOM support tray 213 and the top of the fan assembly 218, is reduced relative to the nominal height h of the fan assembly 218 such that the fan assembly 218 is able to fit into the space allocated to it, as opposed to being slightly too tall. Specifically, as shown in FIG. 4, the effective height h' of the fan assembly 218 is equal to the nominal height h of the fan assembly 218 minus the depth d to which the fan assembly 218 is recessed within the cutout 234.

In the example of FIGS. 2-5, fan frame 216 includes a horizontal flange 240 which abuts a face of the support 213 when the fan frame 216 is mounted thereto and which encircles the cutout 234, i.e., the flange 240 rests on a rim of the cutout 234. The flange 240 includes fastener holes 235 for attaching the fan frame 216 to the support 213 by mechanical fasteners, such as screws. In addition, the fan frame 216 includes a bottom lip 266 which extends down below a bottom face of the flange 240 and into the cutout 234, as shown in FIG. 4. The fan frame 216 also comprises fixed mounting features 236, which extend vertically from the flange 240 on one side thereof and a latch housing 241 which is formed on/in the flange 240 on the opposite side thereof. The fan frame 216 also comprises lateral walls which bound lateral sides of the opening 223, with these lateral walls forming ledges 249.

System 210 may further include a fan assembly 218. The fan assembly 218 may include a fan housing 222 which contains a fan module (not shown) and fan guards 226/228. The fan housing 222 comprises attachment points 238 on the two opposite ends thereof to which the fan guards 226/228 are coupled, with an attachment point 238 at each of the four corners of each of the two ends (only some are labeled in the figures). Each of the attachment points 238 comprises a flange-like ear and a hole 239 through the ear. The fan guards 226 also comprise clips 246 at each of the four corners thereof which protrude from a main body of the fan guard 226 and which have a barbed head. The fan guards 226/228 are coupled to the fan housing by insertion of the clips 246 through the holes 239, with the clips 246 snaping into locked engagement after insertion through the holes 239. The barbed heads of the clips 246 have sloped lead-ins to allow for insertion through the hole 239, but a hook of the barbed heads may then resist withdrawal of the clips 246 from the holes 239, thus attaching the fan guards 226 to the fan housing 222. In some cases, the hole 239 may be smaller in diameter than the barbed head, but the barbed head may be deformable and thus may be compressed/deformed during insertion through the hole and then snap back into its original shape upon clearing the hole 239.

A first fan guard 226 may be coupled to a first end of the fan housing 222. The first fan guard 226 may include a first plurality of teeth 230. Although only one tooth of the first plurality of teeth 230 is shown in FIG. 4, fan guard 226 includes an identical tooth disposed laterally opposite such that first fan guard 226 has more than one tooth. The first plurality of teeth are also further shown in FIGS. 6-8.

A second fan guard 228 is coupled to a second end of the fan housing 222.

Second fan guard 228 includes a second plurality of teeth 232. As shown in FIG. 3, second plurality of teeth 232 may be disposed at a lower portion of second fan guard 228 and may be disposed at opposite ends thereof. More particularly, the second plurality of teeth 232, as well as the first plurality of teeth 230, may extend or protrude outwardly from their respective fan guards 228 and 226. This may allow the teeth to engage with a corresponding structure.

As shown particularly in FIG. 3, fan frame 216 may include a plurality of mounting features 236-1, 236-2 (collectively mounting features 236) formed as part thereof. Mounting features 236 comprise recesses 245 formed into portions of the fan frame 216, with the recesses 245 configured as undercuts, as shown in FIGS. 3 and 4; however, examples are not so limited and other mounting features may be used. Mounting feature 236 may be sized and shaped to receive the first plurality of teeth 230. More particularly, the first plurality of teeth 230 may engage with the mounting features 236 such that mounting features 236 hold the fan assembly 218 at the first plurality of teeth 230. The recess 245 has an opening which faces generally horizontally so that the teeth 230 can be inserted into the recess 245 via the opening along a generally horizontal insertion axis, as shown in FIG. 4. As shown in FIG. 4, the mounting features 236 may receive the first plurality of teeth 230 such that a top portion 244 of the mounting features 236 abuts an upper portion of the first plurality of teeth 230, thereby blocking the teeth 230 from moving upward out of the recess 245. In some examples, to engage the first plurality of teeth 230, each tooth of the first plurality of teeth 230 may be aligned with a corresponding mounting feature 236. Once aligned, the fan module 218 may be slid towards the mounting feature 236 to engage the first plurality of teeth 230 with the mounting features 236. In addition, the fan guards 226/228 comprise wings 247 which protrude laterally from a main body of thereof, and these wings 247 may engage with the fan frame 216 to prevent downward movement of the fan assembly 218 beyond a predetermined depth. Specifically, the bottom surface 248 of the wings 247 abuts a raised ledge 249 which runs along a side of the opening 234, thereby stopping downward motion of the fan assembly 218 beyond a certain point. Thus, with the top portion 244 of the mounting features 236 blocking upward motion of the teeth 230 and the wings 247 blocking downward motion, the teeth 230 are confined within the recess 245 such that the teeth 230 can only move into or out of the recess 245 if moved in a generally horizontal direction. When the fan assembly is in an installed and latched state, portions of the fan frame 216 which form the rim of the opening 223 abut the front/rear faces of the fan guards 226/228 and thereby block horizontal motion of the fan assembly 218. Thus, the teeth 230 cannot leave the recess, which secures the fan assembly 218 to the fan frame 216.

A latching mechanism 224 may be coupled to the fan frame 216. More particularly, the latching mechanism 224 may be disposed within a latch housing 241, which is part of (e.g., formed integrally with), or coupled to, the fan frame 216. The latching mechanism 224 comprises a body 254 with a proximal portion 254a (see FIG. 4), a distal portion 254b (see FIGS. 2 and 5), and a middle portion 254c (see FIG. 4) coupling the proximal portion 254a to the distal portion 254b. The latching mechanism 224 also comprises movable mounting features 237 coupled to the proximal portion 254a of the body 254 and a handle 264 coupled to a distal portion 254b of the body 254. The latching mechanism 224 may be longitudinally movable with respect to the fan frame 216 and thus with respect to the installed fan module 218. More particularly, the latching mechanism 224 may be movable between a latched position (shown in FIG. 4) and an unlatched position (shown in FIG. 5). Examples of the latching mechanism 224 are discussed further herein with respect to FIGS. 6-9.

As shown in FIGS. 2-5, the latch housing 241 may contain the latching mechanism 224. More particularly, the latch housing 241 may include an interior chamber 263 in which at least part of the body 254 of latching mechanism 224 is contained (only a portion of the interior chamber 263 is visible in FIGS. 4 and 5, but it should be understood that the interior chamber 263 may extend through the latch housing 241 between first and second openings 242 and 243, described in greater detail below). As shown in FIG. 4, the latch housing 241 abuts the top face of the body 254 of the latch 224 while the support 213 abuts a bottom face of the body 254, and in this manner the body 254 is sandwiched between the latch housing 241 and the support 213. Latching mechanism 224 may be loosely retained within interior chamber 263 such that latch mechanism 224 is movable relative to the fan frame 216.

Latch housing 241 may further include a first opening 242 extending from a first lateral side of the latch housing 241 into interior chamber 263. First opening 242 may be configured to receive a distal portion 254b of a body 254 latching mechanism 224 inserted therethrough and allow latching mechanism 224 to move horizontally with respect thereto. More particularly, as the latching mechanism 224 is moved between a latched position and an unlatched position, the distal portion 254b of the body 254 moves through the first opening 242.

Latch housing 241 also comprises a pair of second openings 243 extending from a second lateral side of the latch housing 241, opposite from the first lateral side, into the interior chamber 263. Second opening 243, like first opening 242, may extend into the interior chamber 263 of latch housing 241 to allow components of latching mechanism 224 to move selectively through second opening 243. More particularly, proximal portion 254a of the body 254 of the latching mechanism 224 extends horizontally from inside the interior chamber 263 to the exterior of the latch housing 241. The proximal portion 254a carries the mounting features 237, discussed further herein, which extend vertically from the proximal portion 254a. The latch housing 241 comprises a pair of notches 265 in a top wall of the latch housing 241. The notches 265 are communicably connected with the second openings 243 and the interior chamber 263 such that the mounting features 237 can vertically extend from the proximal portion 254a through the notches 265 to a region above the latch housing 241. As the latching mechanism 224 moves between the latched and the unlatched positions, the mounting features 237 move horizontally within the notches 265, as shown in FIGS. 2-5.

Latching mechanism 224 may further include a handle 264. The handle 264 may be a protrusion extending upwardly from the distal portion 254b of the body 254 of the latching mechanism 224, as shown in FIGS. 2-5. In other examples, the handle 264 may take some other shape, such as a protrusion extending outwardly from the latching mechanism 224. In some examples, handle 264 is integrally connected to the body 254. In other examples, handle 264 may be a separately formed handle device that is coupled to the latching mechanism by, for example, a fastener, adhesive, or other suitable mounting means. Handle 264 may allow a user to move the latching mechanism 224 with respect to the fan frame 216 by providing a user a location at which the latching mechanism 224 can be pulled or pushed.

As shown in FIGS. 2 and 3, latching mechanism 224 may include movable mounting features 237-1 and 237-2 (collectively, mounting features 237). Mounting features 237, like mounting features 236, may engage the second plurality of teeth 232. FIGS. 4 and 5 in particular show the latching mechanism 224, movable mounting features 237, and second plurality of teeth 232. Movable mounting features 237 have a vertical portion extending vertically from the proximal portion 254a of the body 254 and a horizontal top portion 260 extending perpendicularly from the vertical portion of mounting features 237. These portions define a recess 262 in the form of an undercut, with the top portion 260 forming a top boundary of the recess 262. This recess 262 is to receive one of the teeth 232 protruding horizontally into the recess 262, as will be described in greater detail below, with the top portion 260 abutting the top of the tooth 232 and thereby constraining its motion. Top portion 260 has a sloped lead in surface 261 which slopes downwardly with respect to the top portion 260. The sloped lead in surface 261 is arranged to engage a complementary sloped surface on the bottom of the tooth 232 to facilitate installation of the fan assembly 18.

As shown in FIGS. 4 and 5, second tooth 232 extends perpendicularly from second fan guard 228 at a lower portion thereof. FIGS. 4 and 5 show latching mechanism 224 in an unlatched position, meaning that latching mechanism 224 and specifically mounting features 237 are not engaged with the second plurality of teeth 232. However, when latching mechanism 224 is in a latched position, mounting features 237 may engage with the second plurality of teeth 232. More particularly, mounting features 237 may move with latching mechanism 224 to receive and hold second plurality of teeth 232. As shown in FIGS. 4 and 5, mounting features 237 include a recess 262 in the latching mechanism 224. The recess 262 is sized to receive the second plurality of teeth 232. Thus, when latching mechanism 224 is in the engaged position, second plurality of teeth 232 may engage with the recess 262 of the mounting features 237. More particularly, as described above, latching mechanism 224 may be movable horizontally with respect to fan frame 216 and thus with respect to fan module 218. When the latching mechanism 224 is in an unlatched position, as is shown in FIG. 5, recess 262 is located apart from, or not engaged with, second plurality of teeth 232. As the latching mechanism 224 is moved into a latched position, top portion 260 moves over the upper portion of second plurality of teeth 232 so that recess 262 receives the second plurality of teeth 232 therein. In addition, as shown in FIG. 4, the top surface 260 of the latching mechanism 224 engages with (abuts) an upper portion of the second plurality of teeth 232, preventing upward motion by the second plurality of teeth 232. In addition, fan guard 228 includes wings 247, which block downward motion; thus, the teeth 232 are confined within the recess 262 such that the teeth 232 can only be disengaged from the latching mechanism 224 by movement of the latching mechanism 224 to the unlatched position.

Installation of the fan assembly 218 in the fan frame 216 may proceed in the following manner. First, the fan assembly 218 is positioned over the opening 234 and tilted so that it is oriented at an angle relative to the horizontal, such that the first plurality of teeth 230 are lower than the second plurality of teeth 232. Next the fan assembly 218 is moved downward so that the teeth 230 pass into the opening 234 and become horizontally aligned with the recesses 245 of the mounting features 236. If the fan assembly 218 were horizontal, this downward motion of the fan assembly 218 would not be possible because the teeth 232 would be blocked by the mounting features 237. However, by tilting of the fan assembly, the second plurality of teeth 232 are raised upward, providing enough clearance to allow the first plurality of teeth 230 to be lowered into the opening 234. With the teeth 230 horizontally aligned with the recesses 245, the fan assembly 218 can be moved horizontally towards the mounting features 236 until the teeth 230 are received into the recesses 245 of the mounting features 236. The latch 224 can then be moved to the unlatched position, and the fan assembly 218 can be pivoted (rotated) about the first teeth 230 so that the second teeth 232 move downward. With the latch 224 in the unlatched position, there is sufficient clearance for the second teeth 232 to move downward past the top portion 260 of the mounting features 237 until the teeth 232 are horizontally aligned with the recesses 262. The latch 224 can then be moved to the latched position, causing the mounting features 237 to move horizontally over the teeth 232 and the teeth 232 to be received in recesses 262. In this state, the mounting features 236 engage with and hold teeth 230 while the mounting features 237 engage with and hold teeth 232, thus securing the fan assembly 218 to the frame 216.

During the installation of the fan assembly 218, the latch 224 is moved from the latched position to the unlatched position to allow the teeth 232 to move past the mounting features 237. In some cases, this motion of the latch 224 can be achieved by a user manually moving the latch 224, such as by grasping and moving the handle 264. In some cases, this motion of the latch 224 can be achieved without the user having to manually handle the latch 224 directly, with the motion instead being caused by interaction between the teeth 232 and the sloped lead-in surfaces 261. That is, the user may pivot the fan assembly 218 downward until the sloped bottom surface of the teeth 232 collide with the sloped lead-in surfaces 261, and the interaction between these sloped surfaces may convert the downward motion of the teeth into horizontal translation of the latch 224.

During the installation of the fan assembly 218, the latch 224 is moved from the unlatched position to the latched position to engage the mounting features 237 with the teeth 232. In some cases, this motion of the latch 224 can be achieved by a user manually moving the latch 224, such as by grasping and moving the handle 264. In some cases, this motion of the latch 224 can be achieved without the user having to manually handle the latch 224 directly, with the motion instead being caused by a spring force applied to the latch 224 (e.g., by a spring mechanism, not illustrated). For example, if the user had manually moved the latch 224 to the unlatched position, the user could move the latch 224 back to the latched position by simply releasing the handle 264 and allowing the spring to return the latch 224 to the latched position. As another example, if the user had moved the latch 224 to the unlatched position by collision between the teeth 232 and the sloped lead-in surfaces, then the spring forces may cause the latch 224 to automatically snap back into the latched position as soon as the teeth 232 have moved downward past the top portion 260 of the mounting features 237. This can allow a user to install the fan assembly 218 using just one hand.

In some examples, the latching mechanism 224 may have restraint features which apply restraining forces to hold the latch 224 in the latched position and prevent inadvertent unlatching (such as due to shock or vibration), while still allowing a user to overcome manually move the latch 224 to the unlatched position if desired. FIGS. 6-9 illustrate two example fan mounting systems 310/410 which are two example implementation of the fan mounting system 210 that use two different approaches to these restraint features. In the fan mounting system 310 of FIG. 6-7 the restraint features include detent features, while in the fan mounting system 410 of FIG. 8-9 the restraint features include spring features.

Figure 6:
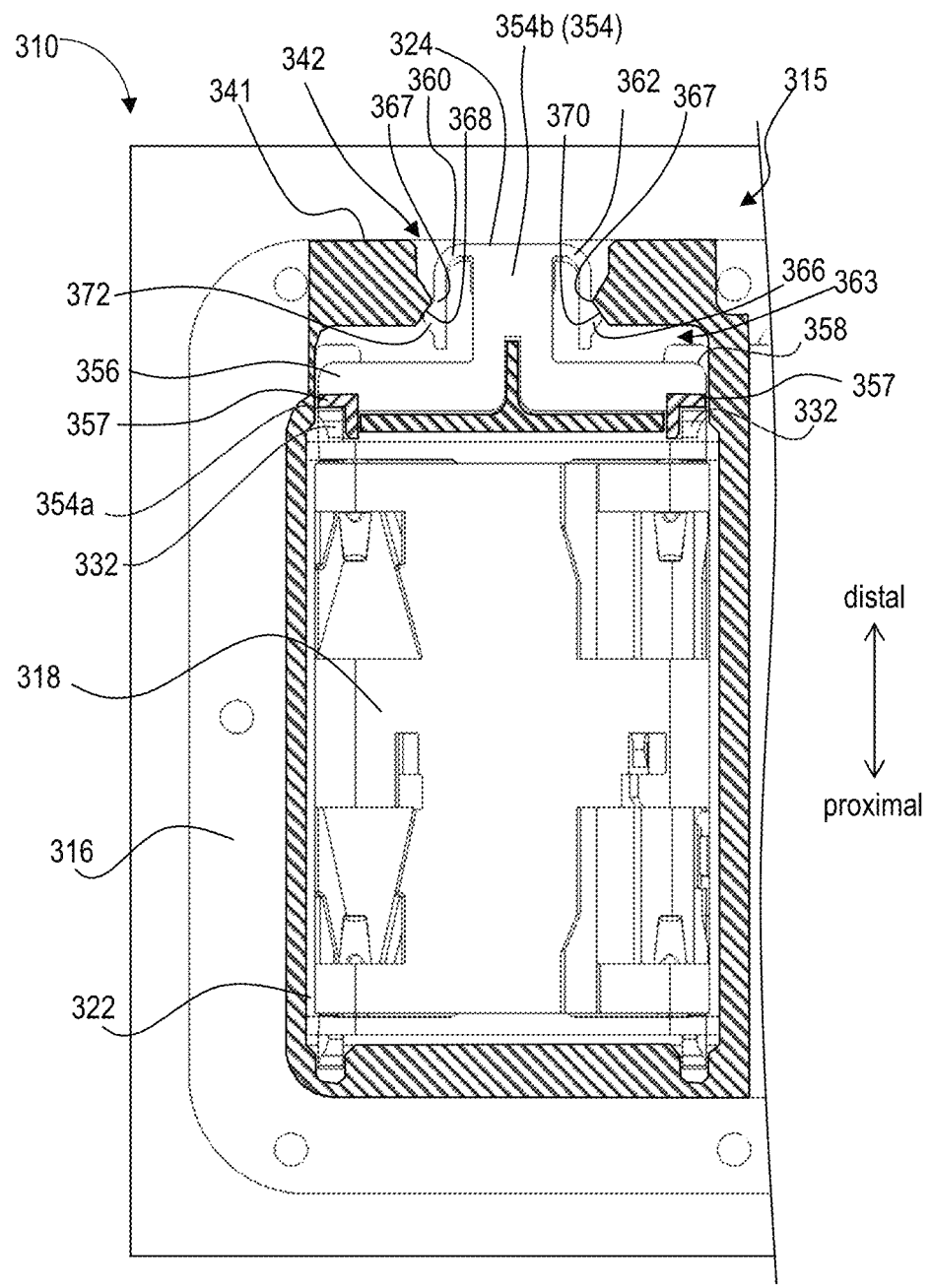
FIG. 6 is a top view with partial cross-section of an example fan mounting system consistent with the present disclosure shown with a latch thereof in a latched state.
Figure 7:
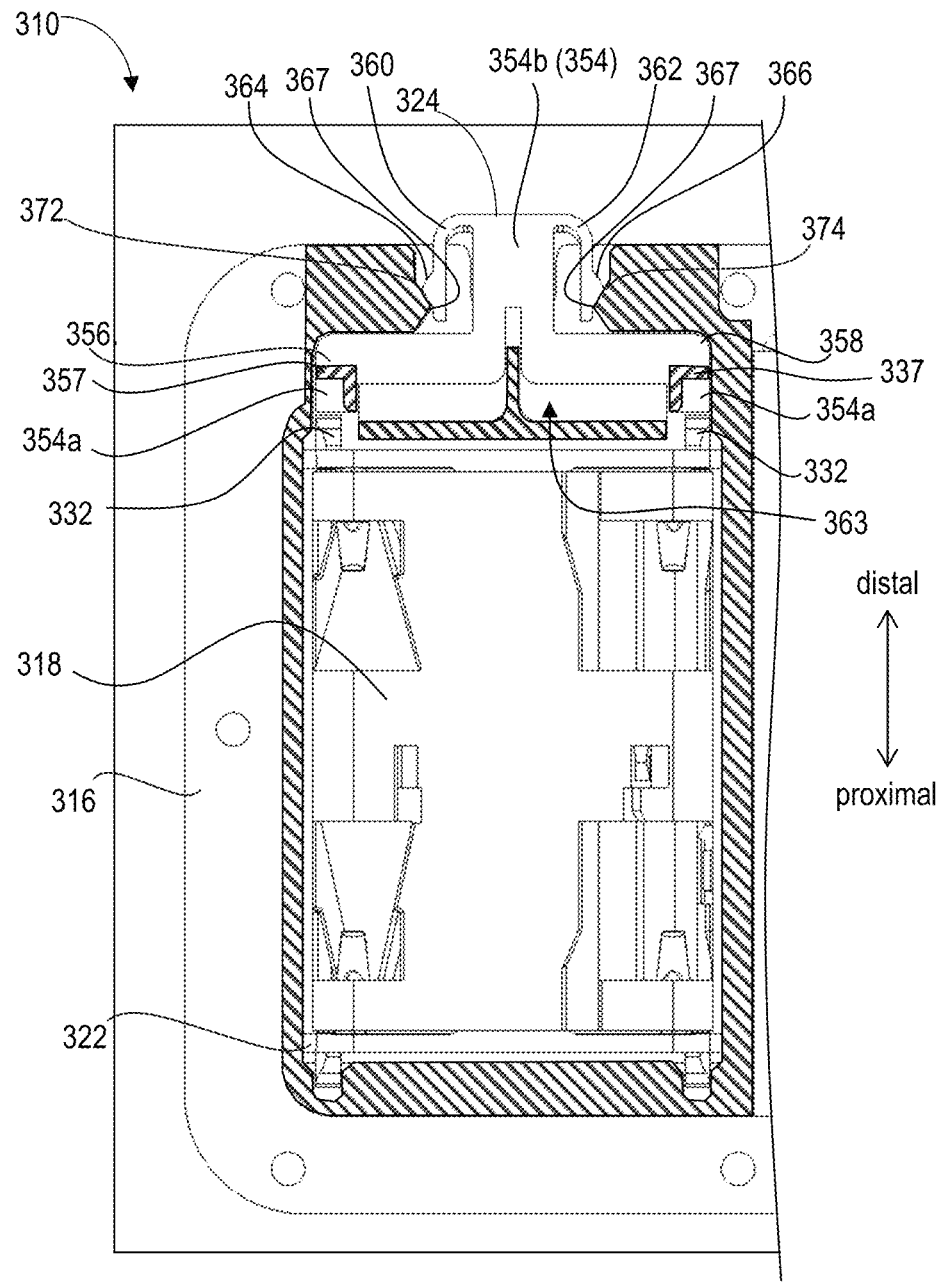
FIG. 7 is a top view with partial cross-section of the fan mounting system of FIG. 6 shown with the latch in an unlatched state.

An example of a fan mount 315 with a fan frame 316 and a latching mechanism 324 is shown in FIGS. 6 and 7. FIG. 6 is a cross-section taken along a plane of the fan support structure, with the fan assembly being excluded from the cross-section (i.e., the fan assembly is not cut in the figure). Fan mount 315 is an example implementation of fan mount 15 and/or 215, fan frame 316 is an example implementation of fan frame 16 and/or 216, latching mechanism 324 may be one example of latching mechanism 24 or the latch mechanism 224 and may be disposed as part of system 310, which may be one example of system 10 described with respect to FIG. 1. Latching mechanism 324 includes a body portion 354 comprising a pair of proximal body portions 354a, a distal body portion 354b, and a pair of legs 356, 358 connecting the proximal body portions 354a to the distal body portion 354b. The proximal body portions 354a and distal body portions 354b are example implementations of the proximal body portions 254a and distal body portions 254b. The legs 356 and 358 are one example implementation of the middle portion 254c of body 254 of latching mechanism 224. Each leg 356, 358 is connected to a proximal body portion 354a which extends horizontally away from the leg 356 or 358 in a proximal direction. Each proximal body portion carries a mounting feature 357, which extends vertically from the proximal body portion 354a. The mounting features 357 are configured to selectively engage with the second plurality of teeth 332 of fan assembly 318 as described previously. Mounting features 357 are similar to mounting features 257 and thus are not described in detail herein.

Latching mechanism 324 may further include a pair of arms 360, 362 extending outwardly from a distal portion 354b of the body 354. Each arm 360, 362 may include a detent feature 364, 366, respectively. Detent features 364, 366 may extend outwardly and generally perpendicular to the arms 360, 362 such that the detent features 364, 366 may engage with corresponding stop features 367 of the fan frame 316. The stop features 367 are disposed inside the interior chamber 363 of the latch housing 341 and may protrude laterally inward towards the arms 360, 362.

More particularly, the arms 360, 362 may be deformable; that is, arms 360, 362 may bend when pressure is applied to them. In some examples, arms 360, 362 may deform in response to force applied by collision with the corresponding stop feature 367 as the latch 324 is moved relative to the latch housing 341. As the latch 324 is moved, the detents 364, 366 collide with the stops 367 and sloped or curved surfaces thereof interact to force the detents 364, 366 inwardly, thus bending/flexing the arms 360, 362 inwardly (towards distal portion 354b of body 354. As the arms 360, 362 flex in this manner, an elastic restoring force (spring force) resists the flexing. If the arms 360 are flexed sufficiently far, the detents 364,366 can slide with respect to the fan frame 316 past the stops 367. In this manner, the latching mechanism 324 may be moved between a lock position and an unlock position. Flexing the arms 360,362 sufficiently to allow them to move past the stops 367 may require application of a force to the latch 324 which is sufficiently strong to overcome the resisting spring force generated by the arms 360, 362. The spring arms 360,362 may be configured to supply a resisting spring force that it is sufficiently large to prevent inadvertent movement of the latch 324, such as may occur due to shock or vibration, but also small enough that a user would be capable of overriding the spring force and manually moving the latch 324 when desired. The spring force may be set to a desired level by adjusting the shape, thickness, and/or material of the arms 360, 362, and/or by adjusting the shape/size of the detents 364, 366 and/or stops 367. In the lock position, shown in FIG. 6, latching mechanism 324 is engaged with the fan frame 316 in a first position, which is a most proximal position of the latching mechanism 324. In this position, the distal portion 354b of the latch 324 is at a proximal-most position in the first opening 342 and the detent features 364, 366 engage (e.g., abut) first sides 368, 370, respectively, of the stops 367 of the fan frame 316. Because the detent features 364, 366 engage (e.g., abut) first sides 368, 370 of the stops 367, the detent features 364, 366 resist movement of the latch in the distal direction. In other words, to move the latch 324 in the distal direction from this position would require bending the arms 360,366 so that the detents 364, 366 can travel over the stops 367, and this motion is resisted by the internal spring force of the arms 360,366. As further shown in FIG. 6, legs 356, 358 are in a proximal-most position and thus the mounting features 357 of latching mechanism 324 are engaged with second plurality of teeth 332. Thus, latching mechanism 324 is engaged with both the fan housing 322 at the second plurality of teeth 332 and at the fan frame 316 at the first locations 368, 370. In this manner, the fan housing 322, and thus the fan module contained therein, are locked into the fan frame 316.

In the unlock position, shown in FIG. 7, latching mechanism 324 engages with the fan frame 316 in a second position, which is a distal-most position of the latch 324. More particularly, the latching mechanism 324 has been disengaged from the lock position of FIG. 6 and slidably moved in a direction transverse the fan frame 316 to disengage the latching mechanism 324. As the latch moves to the unlock position, the detents 364, 366 slide along the stops 367 and this deforms the arms 360, 362. Eventually, the latch 324 reaches the locked position, whereupon the detent features 364, 366 engage with (abut) second sides 372, 374 of the stops 367 of the fan frame 316. As shown in FIG. 7, the second sides 372, 374 may be located further from the fan housing 322 than the first sides 368, 370 shown in FIG. 6. Because the detents 364, 366 abut the second sides 372, 374 of the stops 367, in this position the detents 364, 366 now resist movement of the latch 324 in the proximal direction. In other words, to move the latch 324 in the proximal direction from this position would require bending the arms 360,362 so that the detents 364, 366 can travel over the stops 367, and this motion is resisted by the internal spring force of the arms 360,366. In addition, in the unlock position, the legs 356, 358 are at a distal most position within the interior chamber 363, and the mounting features 357 are thus moved distally and disengaged from the second plurality of teeth 332. Thus, fan housing 322, and the fan module contained therein, are able to be removed from the IOM assembly 316.

Thus, because the detents 364,366 of latching mechanism 324 engage with opposite sides of the stops 367 in the locked and unlocked positions, the detents 364, 366 serve to hold the latching mechanism 324 in whichever of the two positions the latching mechanism 324 happens to currently be in and to resist movement of the latching mechanism 324 to the other position. As a result, once the latching mechanism 324 is in the unlock position, a user is able to use a single hand to remove the fan 318 from the fan frame 316 and is not required to simultaneously use another hand to hold the latching mechanism 324 in the unlock position. As a result, the removal of the fan 318 may be a one-handed operation.

Figure 8:
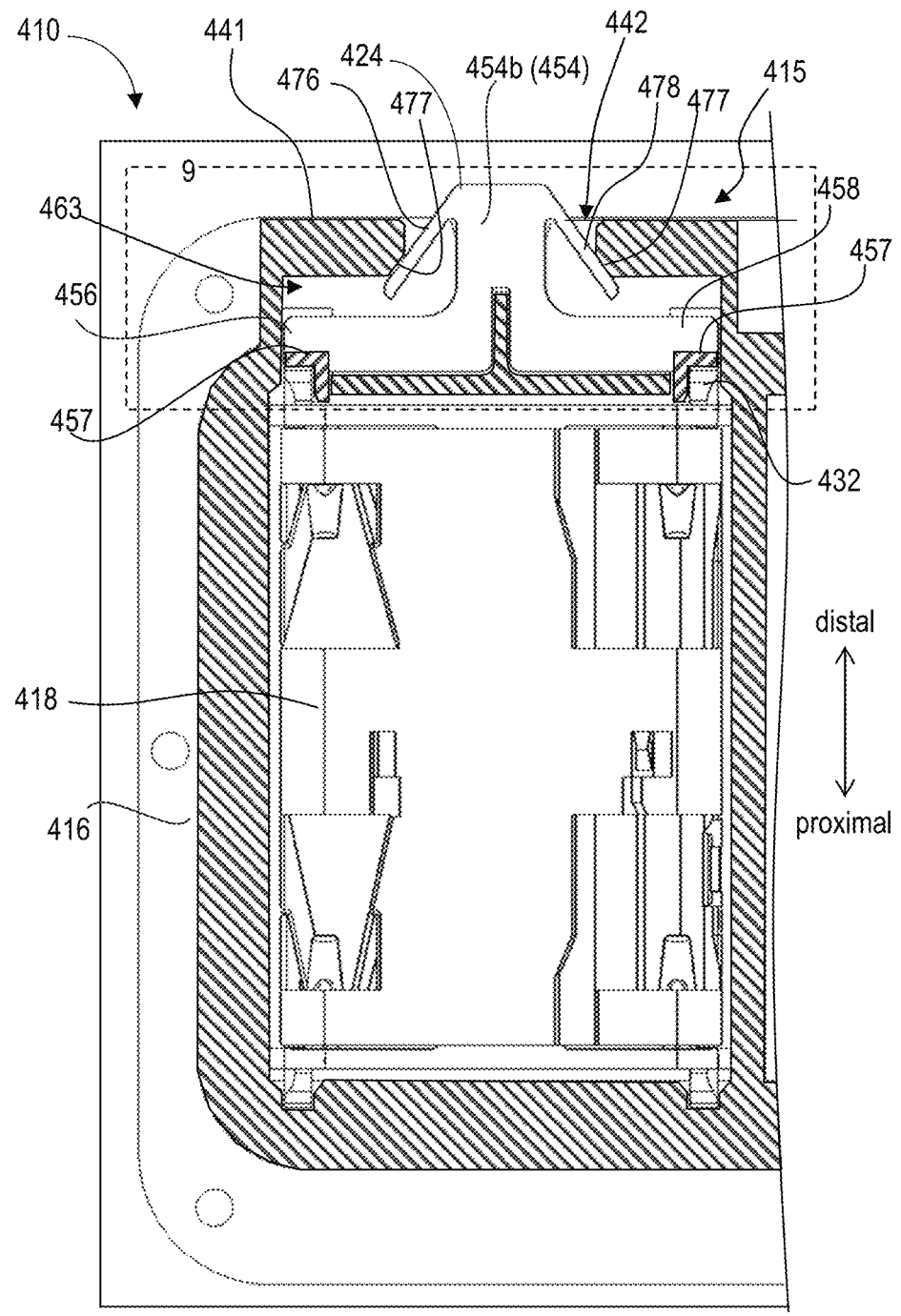
FIG. 8 is a top view with partial cross-section of an example fan mounting system consistent with the present disclosure shown with a latch thereof in a latched state.
Figure 9:
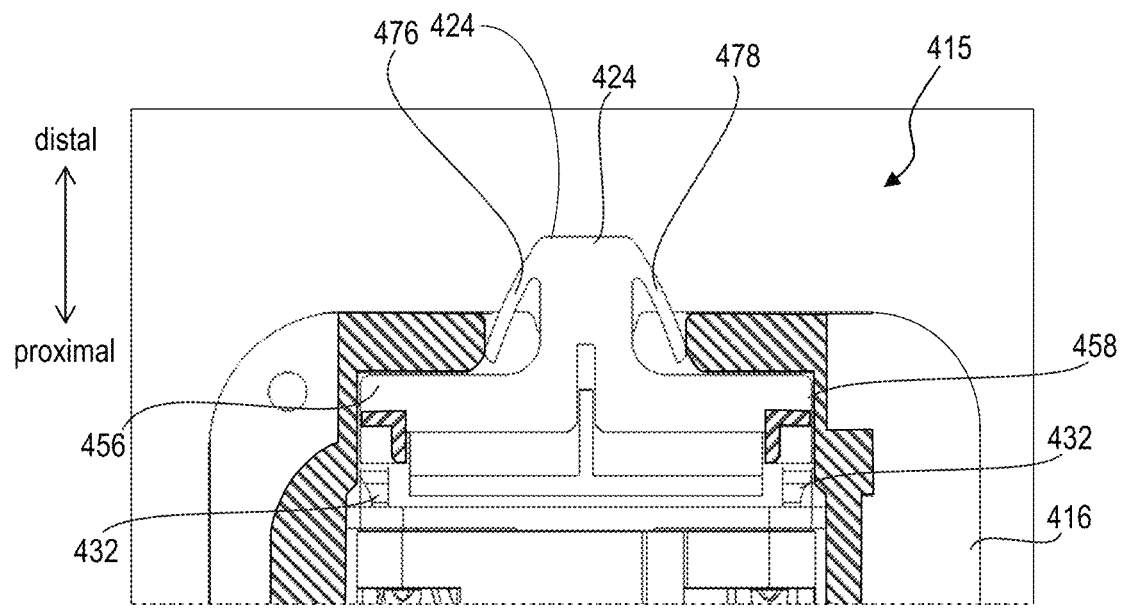
FIG. 9 is a top view with partial cross-section showing a portion of the fan mounting system of FIG. 8 corresponding to box 9 in FIG. 8 and shown with the latch in the unlatched state.

FIGS. 8 and 9 show another example of fan mount 415 with a fan frame 416 and a latching mechanism 424, with FIG. 9 being a detail view taken along line 9 of FIG. 8. Fan mount 415 is an example implementation of fan mount 15 and/or 215, fan frame 416 is an example implementation of fan frame 16 and/or 216, and latching mechanism 424 is another example implementation of latching mechanism 24 and/or 224. Latching mechanism 424 may be shaped similarly to the latching mechanism 324 except that latching mechanism 424 comprises of angled spring arms 476, 478 instead of arms 360, 362 with detents 364,366. The latching mechanism 442 includes a body portion 454 which has proximal portions 454a, a distal portion 454b, and a pair of legs 456, 458 extending between the proximal and distal portions 454a and 454b. The proximal portions 454a carry mounting features 457 which extend vertically therefrom and which are configured to engage teeth 432 of the fan assembly 418.

Latching mechanism 424 may further include a plurality of arms 476, 478 extending from a distal portion 454b of the body 454 and configured to provide a spring-biasing mechanism for the latch which biases the latch towards the locked position. As shown in FIGS. 8 and 9 the arms 476, 478 extend outwardly and proximally from the body 454 at an acute angle, but in other examples different angles could be used and/or the arms 476,478 could have some other shape such as curved. Each arm 476, 478 is formed from an elastic or semi-elastic material such that it can deform elastically like a spring, meaning that when deformed it generates an internal restoring spring force which urges the arms 476, 478 back towards a resting or non-deformed shape.

As shown in FIGS. 8 and 9, the arms 476, 478 engage with opposing surfaces 477 of the latch housing 441 inside the internal chamber 463 thereof near the first opening 442. The arms 476, 478 and the surfaces 447 are arranged such that, as the latch 424 is moved to the unlocked position (FIG. 9), the surfaces 447 push against the arms 476, 478 and deform (bend) them inwardly away from their resting shape, generating a restoring spring force which urges the arms 476, 478 outwardly. This causes the spring arms 476,478 to push outwardly on the surfaces 447, which is converted by the contact therebetween into a force urging the latch 424 to move proximally. In other words, the spring arms 476, 478 generate spring forces which bias the latch 424 towards the proximal direction (i.e., towards the locked position). Thus, the latch 424 will tend to stay in the locked position unless an external force is applied (e.g., by a user) to move the latch 424 to the unlatched position, and as soon as the external force is removed the latch 424 will automatically return to the locked position. When the latch 424 is in the locked position (FIG. 8) the arms 476, 478 are either at their resting or non-deformed shape (e.g., not bent at all) or they are closer to their resting shape than they are in the unlocked position (e.g., they are still slightly bent, but less so than when in the unlocked position), which means that less restoring spring force is generate in this position, or possible none at all. maintaining the latching mechanism 424 in the lock position shown in FIG. 8, when the arms 476, 478 are deformed and the latching mechanism 424 is slid away from the fan frame 416, a user must maintain the deformation on the arms 476, 478. Said differently, latching mechanism 424 needs to be actively maintained in the unlock position shown in FIG. 9 while the fan 418 is being removed. As a result, removal of the fan 418 may require two hands, one to hold the fan 418 and one to operate the latching mechanism 424.

Figure 10:
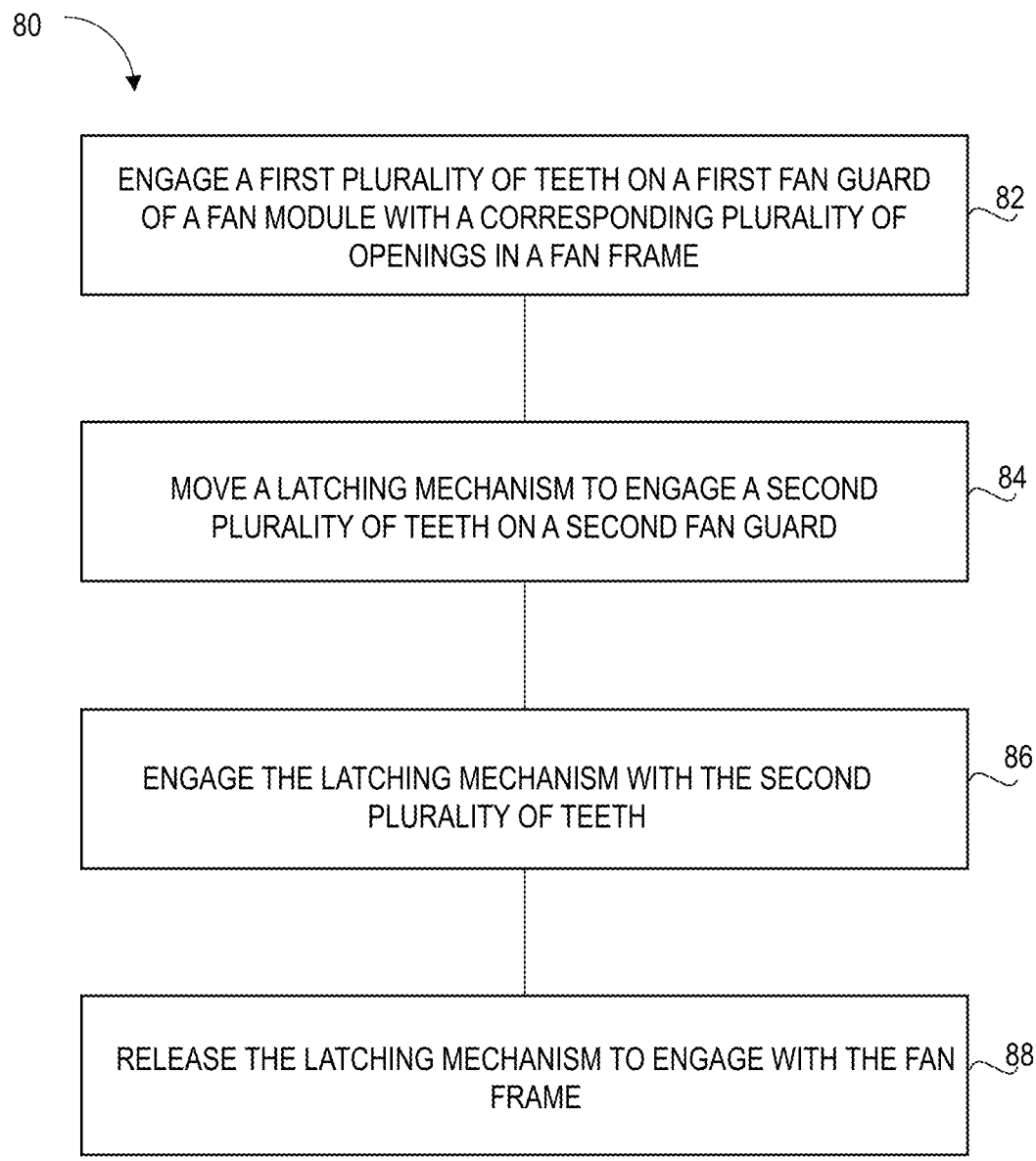
FIG. 10 is a process flow chart illustrating an example method for using a fan mounting system consistent with the present disclosure.

FIG. 10 is an example method 80 for using a fan mounting system consistent with the present disclosure. At 82, method 80 includes engaging a first plurality of teeth on a first fan guard of a fan module with a corresponding plurality of openings in a fan frame. As discussed previously with respect to FIGS. 2-5, the fan frame may include openings, or another variety of mounting feature, formed as part of the frame, while the first fan guard may include a plurality of outwardly protruding, integrally formed teeth. To engage the first plurality of teeth with the corresponding plurality of openings, each tooth of the first plurality of teeth may be aligned with a corresponding opening. Once aligned, the fan module may be slid into the fan frame such that the first plurality of teeth slide into the openings and are received and held by the openings.

At 84, method 80 includes moving a latching mechanism to engage a second plurality of teeth on a second fan guard of the fan module. The latching mechanism may be latching mechanism 324, discussed with respect to FIGS. 6 and 7, latching mechanism 424, discussed with respect to FIGS. 8 and 9, or may be any other suitable latching mechanism. As described previously with respect to FIGS. 6-9, the latching mechanism may include a plurality of legs formed as part of the latching mechanism. Each leg of the plurality of legs may include an undercut or other mounting feature that allows the latching mechanism to engage with the second plurality of teeth.

More particularly, the latching mechanism may be slidable perpendicular to the fan frame and may include a plurality of deformable arms that, when deformed, allow the latching mechanism to slide. When the latching mechanism is moved, the plurality of legs may be moved such that they contact the second plurality of teeth.

At 86, method 80 includes engaging the latching mechanism with the second plurality of teeth. Once contact between the plurality of legs and the second plurality of teeth make contact, the undercut of the legs engage with their corresponding tooth of the second plurality of teeth. The engagement is shown in FIGS. 4 and 5, in particular, show how the latching mechanism engages with the second plurality of teeth.

At 88, method 80 includes releasing the latching mechanism. Releasing the latching mechanism allows the latching mechanism to engage with the fan frame and lock the fan module into the fan module. More particularly, releasing the latching mechanism includes releasing the plurality of arms of the latching mechanism. Releasing the plurality of arms of the latching mechanism allow the arms to push against the fan fame, as discussed with respect to FIGS. 6-9. As such, the fan module is locked into the fan frame and will not move unless and until the latching mechanism is slid back away from the fan frame.

It is to be understood that both the general description and the detailed description provide example implementations that are explanatory in nature and are intended to provide an understanding of the present disclosure without limiting the scope of the present disclosure. Other examples in accordance with the present disclosure will be apparent to those skilled in the art based on consideration of the disclosure herein. For example, various mechanical, compositional, structural, electronic, and operational changes may be made to the disclosed examples without departing from the scope of this disclosure, including for example the addition, removal, alteration, substitution, or rearrangement of elements of the disclosed examples, as would be apparent to one skilled in the art in consideration of the present disclosure. Moreover, it will be apparent to those skilled in the art that certain features or aspects of the present teachings may be utilized independently (even if they are disclosed together in some examples) or may be utilized together (even if disclosed in separate examples), whenever practical. In some instances, well-known circuits, structures, and techniques have not been shown or described in detail in order not to obscure the examples. Thus, the following claims are intended to be given their fullest breadth, including equivalents, under the applicable law, without being limited to the examples disclosed herein.

References herein to examples, implementations, or other similar references should be understood as referring to prophetic or hypothetical examples, rather than to devices/systems that have been actually produced, unless explicitly indicated otherwise. Similarly, references to qualities or characteristics of examples should be understood as representing the educated estimates or expectations of the inventors based on their understanding of the relevant principles involved, application of theory and/or modeling, and/or past experiences, rather than as being representations of the actual qualities or characteristics of an actually produced device/system or the empirical results of tests actually carried out, unless explicitly indicated otherwise.

Further, spatial, positional, and relational terminology used herein is chosen to aid the reader in understanding examples of the invention but is not intended to limit the invention to a particular reference frame, orientation, or positional relationship. For example, spatial, positional, and relational terms such as "up", "down", "lateral", "beneath", "below", "lower", "above", "upper", "proximal", "distal", and the like may be used herein to describe directions or to describe one element's or feature's spatial relationship to another element or feature as illustrated in the figures. These spatial terms are used relative to reference frames in the figures and are not limited to a particular reference frame in the real world. Furthermore, if a different reference frame is considered than the one illustrated in the figures, then the spatial terms used herein may need to be interpreted differently in that different reference frame. Moreover, the poses of items illustrated in the figure are chosen for convenience of illustration and description, but in an implementation in practice the items may be posed differently.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition. Moreover, unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

What is claimed is:

1. An information processing system, comprising:
   a support tray;
   a chassis housing and supporting the support tray;
   a recessed fan frame attached to the support tray and configured to receive a fan assembly;
   wherein the fan assembly comprises:
     a fan rotor;
     a fan housing containing the fan rotor;
     a first fan guard coupled to a first end of the fan housing and a second fan guard coupled to a second end of the fan housing opposite the first end;
     a first set of teeth integrally formed with and protruding from the first fan guard; and
     a second set of teeth integrally formed with and protruding from the second fan guard; and
   a latching mechanism coupled to the fan frame and comprising a plurality of movable mounting features, wherein the latching mechanism is movable relative to the fan frame between a latched position and an unlatched position to selectively engage the movable mounting features with the second plurality of teeth,
   wherein the fan frame includes a plurality of fixed mounting features to selectively engage with the first plurality of teeth,
   wherein engagement of the fixed mounting features with the first plurality of teeth and the movable mounting features with the second plurality of teeth attaches the fan housing to the fan frame.

2. The system of claim 1, further comprising an input/output module (IOM) comprising the support tray, wherein the chassis is configured to removably house the IOM module.

3. The system of claim 1, wherein the support tray further comprises a cutout to receive the fan frame.

4. The system of claim 3, wherein the fan frame is mounted to the support tray such that an opening of the fan frame aligns with the cutout of the support tray and the fan assembly is disposed at least partially within the cutout.

5. A fan mounting system, comprising:
   a fan assembly comprising:
     a fan housing;
     a first fan guard coupled to a first end of the fan housing and including a first plurality of teeth; and
     a second fan guard coupled to a second end of the fan housing opposite the first end of the fan housing and including a second plurality of teeth;
   a recessed fan frame configured to receive the fan assembly, wherein the fan frame includes a plurality of fixed mounting features to selectively engage with the first plurality of teeth; and
   a latching mechanism coupled to the fan frame and comprising a plurality of movable mounting features, wherein the latching mechanism is movable relative to the fan frame between a latched position and an unlatched position to selectively engage the movable mounting features with the second plurality of teeth,
   wherein engagement of the fixed mounting features with the first plurality of teeth and the movable mounting features with the second plurality of teeth attaches the fan housing to the fan frame.

6. The fan mounting system of claim 5, wherein the latching mechanism further comprises:
   a body portion;
   a pair of legs extending from the body portion, wherein each leg of the pair of legs carries one of the movable mounting features; and
   a pair of arms extending outward from the body portion, wherein the pair of arms engages with the fan frame to resist motion of the latching mechanism from the latched position to the unlatched position.

7. The fan mounting system of claim 6, wherein:
   the pair of arms is deformable;
   each arm of the pair of arms further includes a detent feature;
   the fan frame includes stops configured to engage the detent features of the pair of arms;
   the detent features engage a first side of the stops of the fan frame when the latching mechanism is in the latched position such that the stops hold the latching mechanism in the latched position; and
   the detent features engage a second side of the stops of the fan frame when the latching mechanism is in the unlatched position such that the stops hold the latching mechanism in the unlatched position.

8. The fan mounting system of claim 7, wherein the pair of arms is configured to deform in response to the detent features moving over the stops as the latching mechanism is moved from the latched position to the unlatched position.

9. The fan mounting system of claim 6, wherein:
   each arm of the pair of arms includes a spring feature; and
   the spring feature is biased such that each arm pushes against the fan frame to maintain the latching mechanism in the latched position.

10. The fan mounting system of claim 9, wherein the spring feature deforms when the pair of arms is moved towards the latched position, the deformation generating a restoring spring force which urges the latching mechanism towards the latched position.

11. The fan mounting system of claim 6, wherein the movable mounting features comprise undercuts and the second plurality of teeth slidably engage with the corresponding undercut when the latching mechanism is moved into the latched position.

12. The fan mounting system of claim 5, wherein the latching mechanism is slidably engageable with the fan housing and the fan frame.

13. The fan mounting system of claim 5, wherein the fan frame is configured to mount to a first face of a support structure and to hold the fan housing in a recessed position relative to the first face.

* * * * *